United States Patent
Birkner et al.

[15] 3,635,850
[45] Jan. 18, 1972

[54] FLAME RETARDANT COMPOSITIONS OF STYRENE POLYMERS AND BROMINATED HEXAMETHYL BENZENE

[72] Inventors: Helmut Birkner; Willi Ziegenbein; Anton Schick, all of Marl, Germany

[73] Assignee: Chemische Werke Huls Aktiengesellschaft, Marl, Germany

[22] Filed: Sept. 8, 1969

[21] Appl. No.: 856,208

[30] Foreign Application Priority Data

Sept. 20, 1968 Germany..................P 17 94 182.1

[52] U.S. Cl..................260/2.5 FP, 260/28.5 R, 260/45.7 R, 260/880, 260/893, 260/DIG. 24
[51] Int. Cl.....................C08d 7/10, C08d 11/04, C08j 1/18
[58] Field of Search.........................260/2.5 FP, 47

[56] References Cited

UNITED STATES PATENTS

| | | | |
|---|---|---|---|
| 2,676,927 | 4/1954 | McCurdy et al. | 260/2.5 FP |
| 2,941,965 | 6/1960 | Ingram | 260/2.5 FP |
| 3,058,926 | 10/1962 | Eichhorn | 260/2.5 FP |
| 3,058,929 | 10/1962 | Vanderhoff et al. | 260/2.5 FP |
| 3,250,739 | 5/1966 | Sauer et al. | 260/45.75 |

Primary Examiner—Murray Tillman
Assistant Examiner—Morton Foelak
Attorney—Krafft & Wells

[57] ABSTRACT

A fire resistant composition of styrene polymers containing as fireproofing agents the bromination products of hexamethyl benzene in amounts of about 1–20 percent by weight based on the styrene polymers. In addition to the bromination products of hexamethyl benzene, the composition can include organic chlorine compounds, antimony trioxide and/or foaming agents.

9 Claims, No Drawings

FLAME RETARDANT COMPOSITIONS OF STYRENE POLYMERS AND BROMINATED HEXAMETHYL BENZENE

CROSS-REFERENCE TO RELATED APPLICATION

Applicants claim priority under 35 U.S.C. 119 for application, Ser. No. P 17 94 182.1, filed in the Patent Office of the Federal Republic of Germany on Sept. 20, 1968.

BACKGROUND OF THE INVENTION

The field of the invention is plastic compositions containing a fireproofing agent.

For many uses in building construction and especially for electrical purposes, molded articles of styrene polymers are required which are flame-retardant and which in the absence of a flame will stop burning of their own accord.

Flame-retardant molded objects are obtained by various methods as disclosed in the book by Vogel entitled "Flammfestmachen von Kunststoffen" (1966).

According to the prior art, chlorine-containing substances are used as flameproofing agents for thermoplastic resins. To obtain sufficient flameproofing, large amounts of chlorine-containing substances are added to the resins, which thereby acquire undesirable properties and also experience discoloration and decomposition.

It is also known that bromine-containing organic compounds are effective for this purpose, even in smaller amounts, and that their effectiveness is increased by the addition of various activators. Aliphatic and especially cycloaliphatic bromine compounds are very suitable for this purpose, and especially for flameproofing resins of polystyrene foam. They are, however, less suitable for flameproofing the usual compact objects of molded polystyrene because of their insufficient heat stability.

Organic bromine compounds with aromatically combined bromine are also used for flameproofing polyolefins. For flameproofing solid compact molded objects of polystyrene, these compounds are not effective enough to be suitable.

The state of the prior art flame-retardant styrene compositions may be ascertained by reference to U.S. Pat. Nos. 3,250,739 of Sauer et al. which issued May 10, 1966, and 3,359,220 of Wright which issued Dec. 19, 1967. The patent of Sauer et al. discloses a fire-resistant composition containing 100 parts by weight of polystyrene, 3 to 10 parts by weight of antimony trioxide and 5 to 20 parts by weight of brominated phenol alkenyl ethers and brominated phenol benzyl ethers. The patent of Wright discloses particular brominated aliphatic compounds for use in foamed polystyrene.

Brominated alkyl benzenes with a total of 8 to 10 carbon atoms are also used as flameproofing materials in which at least one alkyl group has had two of its hydrogen atoms substituted by bromine (Canadian Pat. No. 558,230). These, however, also have insufficient chemical and thermal stability, as do benzyl bromide or xylylene dibromide. They also have injurious physiological effects by irritating the mucous membranes.

SUMMARY OF THE INVENTION

Having in mind the limitations of the prior art, it is an object of the present invention to provide thermoplastic moldable masses of styrene polymers and organic bromine compounds, and possibly also organic chlorine compounds and/or antimony trioxide with a possible addition of foaming agents, characterized in that the organic bromine compounds contain bromination products of hexamethyl benzene in amounts of 1 to 20 percent by weight, preferably 1 to 10 percent, based on weight of the styrene polymers.

Styrene polymers used in the present invention are polystyrene, poly-α-methylstyrene and mixed polymers containing styrene or α-methylstyrene which are copolymerized with at least 50 percent of styrene or α-methylstyrene.

As mixed polymer components, acrylonitrile and esters of acrylic and methacrylic acid are used.

Specific examples of the mixed polymers are:

Styrene-acrylonitrile copolymers consisting of 65 to 85 percent by weight of styrene and 35 to 15 percent by weight of acrylonitrile, especially consisting of 25 percent by weight of acrylonitrile and corresponding of 75 percent by weight of styrene; styrene-α-methyl styrene copolymers consisting of about 70 percent by weight of styrene and corresponding of about 30 percent by weight of α-methyl styrene: copolymers of styrene and of the methyl ester of methacrylic acid consisting of about 30 percent by weight of said methyl ester and of about 70 percent by weight of styrene: copolymers of acrylonitrile, of styrene and of the methyl ester of methacrylic acid, consisting of about 20 percent by weight of acrylonitrile of about 70 percent by weight of styrene and of about 10 percent by weight of said methyl ester of the methacrylic acid.

Use can also be made of impact resistant styrene components, as well as the so-called ABS-polymers. The impact resistant styrene polymers are then formed on the elastomeric components by mixing the styrene polymers with the elastomeric components or by graft polymerization of the styrene, possibly in mixtures with polymerizable monomers. Mixtures of these impact resistant styrene polymers are also used.

The preparation of styrene polymers is disclosed in the Kirk-Othmer "Encyclopedia of Chemical Technology," Vol. 13(1954), pages 146–179, under the section "Styrene Resins and Plastics."

The production of the hexamethyl benzene is not claimed as part of the present invention. The preparation of hexamethyl benzene from 2-butyne is disclosed in Kirk-Othmer, Vol. 7 (1952) at page 645, and by trimerization of 2-butyne according to West German Pat. specification, No. 1 280 827, filed Dec. 15, 1964.

The bromination of the hexamethyl benzene is performed likewise by known methods in which, e.g., bromine in suitable solvents is permitted to act upon the hexamethyl benzene at elevated temperatures. Chemical Abstracts, Vol. 63, page 14,655 reports hexamethyl benzene is brominated with 10 percent side chain product obtained by Baciocchi and Illuminate. The abstracted article was published in Ric. Sci. Rend. Sez., Vol. A7(2), pages 462–4 (1964), with the title "Substitution in Polymethylbenzenes." Other methods of halogenating hexamethyl benzene are reported in Chemical Abstracts Vol. 61, pages 2,925 and 5,476, and Vol. 63, pages 5,465 and 5,466.

The individual bromination components, as for example hexa-(brom-methyl)-benzene, penta-(brom-methyl)-methyl benzene, tetra-(brom-methyl)-dimethyl benzene or brommethyl-pentamethyl benzene are also useful. Equally suitable are the mixtures that occur at the different bromination steps according to which there are added: brominated hexamethyl benzenes with a bromine content of about 1 to 6 brom-methyl groups corresponding to about 33 to 76 percent by weight of bromine, and especially those with about 2 to 5.5 brommethyl groups corresponding to about 50 to 74 percent by weight of bromine.

The brominated hexamethyl benzenes are used in amounts from 1 to 20 percent by weight, preferably 1 to 10 percent, based on the the styrene polymer, the brominated hexamethyl benzenes or their mixtures being used in such amounts that the molded bodies contain at least 0.5 percent by weight of bromine.

DESCRIPTION OF THE PREFERRED EMBODIMENTS

Besides the brominated hexamethyl benzenes, chlorinated compounds can be added, such as chlorinated paraffines having a chlorine content of about 50 to 80 percent by weight, chlorinated polyethylenes having a chlorine content of about 30 to 55 percent by weight, dimeric hexachlorocyclopentadiene, known e.g., under the Trade name DECLORANE, chlorinated terphenyl, known e.g., under the Trade name AROCLOR, tris-chloroethyl phosphate, and/or antimony compounds such as antimony trioxide, antimony trisulfide, triphenyl antimony, antimony salts of organic acids, as e.g., antimony (III) caproate.

It is advantageous in all cases to use chlorinated compounds with high chlorine content so that the amount of such added compound can be kept as low as possible. The amounts of antimony compounds, such as antimony trioxide, should also be kept as low as possible. Amounts from 1 to 5 percent by weight, based on the styrene polymer, are generally sufficient.

In addition to the fire-retarding compositions, the molded bodies can also contain other known additives such as stabilizers, antifriction ingredients, fillers, pigments and/or plasticizers.

The molding materials of the present invention containing flame-retarding compositions are preferably used for the production of compact molded objects because the chemical and thermal stability resulting from the presence of such additives is realized to greatest advantage. The materials however can also be used for the production of objects of foamed polystyrene.

The preparation of foamed polystyrene is disclosed in U.S. Pat. Nos. 2,681,321 of Stastny and Gaeth which issued in June 1954, and 2,983,692 of D'Alelio which issued in May 1961. A further disclosure is given in Kirk-Othmer, 2nd Edition, Vol. 9 (1966), under the section entitled "Foamed Plastics," pages 847-880, particularly pages 852, 853 and 855 wherein the foaming of polystyrene is disclosed. Typical blowing agents for polystyrene are the various isomeric pentanes and hexanes, halocarbons, or mixtures of these materials.

For the production of the moldable materials, the brominated hexamethyl benzenes can be mixed with the organic chlorine compounds and/or with antimony trioxide, or these components can be added successively as admixtures to the styrene polymer. They can, for example, be added to plastic material on a roller or in an extruder or kneader. The bromine compounds can also be added before, during or immediately after polymerization.

The flame-retarding ability of the moldable materials can be tested by the following method:

The material to be tested is formed into molded objects 100×10×2 mm. The molded objects are vertically suspended and are positioned with their lower edges in a small luminous flame of a Bunsen burner (length of flame about 2 cm.) until they begin to take fire. After removal of the flame, the time during which the sample continues to burn is measured. The test is repeated five times for each sample.

The combustibility of the material is also determined by the method of ASTM D 635-56 T according to which the material is formed into samples 127×12, 7×3 mm., and the sample is then twisted trough 45° about a horizontal axis. The end of the so fixed sample is then contacted with the tip of the flame of a Bunsen burner 5 mm. in diameter, the flame being 12 to 13 mm. high. The duration of the flame contact is 2×30 seconds. If the sample does not continue to burn at all, it is classified as "nonburning by this test." If the sample continues to burn, but not beyond the 4-inch mark, then such a material is designated as "self-extinguishing by this test." If the sample continues to burn further, it is designated as "burning by this test."

The bromination products of hexamethyl benzene which have been produced according to this invention, in contrast to the known brom-alkyl compounds of incompletely substituted benzene, are completely hydrolyses stable under storage and working conditions. They are also odorless and not irritating to the skin.

In comparison with the purely aliphatic bromine compounds, the added brominated hexamethyl benzenes of this invention possess greater thermal stability at simultaneously high efficiency while being worked upon. Because of such greater thermal stability, the increased temperatures caused by working operations will not cause discolorations or corrosion of machining tools.

Without further elaboration, it is believed that one skilled in the art can, using the preceding description, utilize the present invention to its fullest extent.

Examples A through D illustrate the preparation of the brominated hexamethyl benzene raw materials including hexakis-(brom-methyl)-benzene and mixtures of lower brominated hexa-methyl benzene, consisting of a definitive average amount of bromine.

EXAMPLE A

Preparation of hexakis-bromomethyl-benzene:
130 g. (0.8 moles) hexamethyl-benzene in 1,500 ml. dibromo ethane are introduced into a 4 l three-necked flask fitted with a stirrer, dropping funnel and a reflux condenser. This mixture is heated in an oil bath to result in a solution. While stirring 1 100 g. (6,88 moles) bromine are added dropwise to the solution boiling under reflux conditions. For another 2 hours it is stirred, while the solution remains under reflux conditions. Twelve hundred ml. of the solvent are distilled off under normal pressure and the hot precipitate is sucked off. The precipitate is washed with chloroform to a light white color. Furthermore it is dried at 50° C. Yield: 385 g. (75,7 percent of the theoretical amount) hexakis-bromomethyl-benzene
Bromine contents: of about 75,5 percent
Melting Point: 300 to 303° C.

EXAMPLE B

Reaction product from hexamethyl benzene with bromine in the molar ratio 1:6:
As described in example A. 767 g. (4,8 moles) bromine are added to a boiling solution of 130 g. (0,6 moles) hexamethyl benzene in 750 ml. dibromo ethane in about 4 hours. The boiling solution remains under reflux conditions until the refluxing solvent contains no bromine (for about 5 hours). After washing with chloroform the light white precipitate obtained melts at about 290° C. and its bromine content is about 73 percent, corresponding to 5,5-brom-methyl groups. Yield: 300 to 340 g.

EXAMPLE C

Reaction product from hexamethyl benzene with bromine in the molar ratio 1:2:
As described in the foregoing example a solution of 130 g. (0,8 moles) hexamethyl benzene in 1 500 ml. boiling dibromoethane is reacted with 256 g. (1,6 moles) bromine. After distilling off the solvent the residue is distilled under diminished pressure.
Yield: 220 g.
Melting Point: 145° to 163° C.
Bromine contents: 52,8 percent, corresponding to 2,2-brommethyl groups.

EXAMPLE D

Reaction products from hexymethyl benzene with bromine in the molar ratio 1:1,12:
As described in example C. 260 g. (1,6 moles) hexamethyl benzene in 1 500 ml. boiling dibromo-ethane are reacted with 288 g. (1,8 moles) bromine; the reaction product is worked up as described.
Yield: 337 g.
Melting Point: 111° to 131° C.
Bromine contents: 34,6 percent corresponding to 1,1-brommethyl groups.

The preparation of the fire-resistant compositions using the bromination products of hexamethyl benzene is illustrated in examples 1 through 14.

EXAMPLE 1

One hundred parts by weight of an impact resistant polystyrene which contains 9 percent by weight of a styrene-butadiene copolymer as a caoutchouc component, 8 parts by weight of a bromination product of hexamethyl benzene containing about 5.5 bromine atoms per molecule, 2 parts by weight of chlorinated paraffin (70 percent chlorine) and 2 parts by weight of antimony trioxide, as well as 0.5 part by weight of a lead phosphite are intimately mixed and homogenized in an extruder. The resulting light granulate is pressed into plates from which the samples that are needed for flame resistance testing are cut. Burning times of 8, 7, 9, 6 and 5 seconds were measured. Under the ASTM D 635–56 T test the product in the form of 2 and 4 mm. thick test samples always qualified as "nonburning."

EXAMPLE 2

As described in example 1, 8 parts by weight of hexa-(brommethyl)-benzene and 5 parts by weight of antimony trioxide are worked into 100 parts by weight of an impact resistant polystyrene which contains 5.5 parts by weight of a caoutchouclike styrene-butadiene copolymer. The after burning times during flame testing were 3, 2, 3, 6 and 7 seconds.

If instead of the 8 parts by weight of hexa-(brom-methyl)-benzene, 10 parts by weight of hexa-brom-diphenyl ether are used, the test samples after being ignited once or twice will burn up completely in the course of about 100 seconds.

If instead of the 8 parts by weight of hexa-(brom-methyl)-benzene, 10 parts by weight of a cyclic organic chlorine compound with a chlorine content of about 65 percent and 10 parts by weight of antimony trioxide are added to the impact resistant polystyrene and homogenized on a roller, the samples burn off completely after a single ignition.

EXAMPLES 3 to 7

One hundred parts by weight of an impact resistant polystyrene which contains 5.5 percent by weight of a caoutchouclike butadiene-styrene copolymer are mixed with 2 parts by weight of $Sb_2O_3$ and 2 parts by weight of a chlorinated paraffin with a chlorine content of 70 percent and 6 parts by weight of brominated product of hexamethyl benzene according to table 1 and the mixture is homogenized on a roller.

TABLE 1

| Example No. | Average Number of Br atoms per molecule | Br content of— The additive in percent | Br content of— The mixture in percent | After-burning times in seconds |
|---|---|---|---|---|
| 3 | 6 | 76 | 4.1 | 7–9–6–5–8 |
| 4 | 5.5 | 74 | 4.0 | 7–4–6–3–4 |
| 5 | 5 | 72 | 3.9 | 7–5–6–8–4 |
| 6 | 4 | 67 | 3.7 | 10–5–11–10–8 |
| 7 | 3 | 60 | 3.3 | 5–3–8–6–12 |

EXAMPLES 8 to 12

Every 100 parts by weight of the polystyrenes of table 2 are mixed with 8 parts by weight of hexa-(brom-methyl)-benzene, 2 parts by weight of antimony trioxide and 2 parts by weight of a chlorinated paraffin with a chlorine content of 70 percent. The mixtures are homogenized on a roller and then comminuted. The comminuted material is then pressed into plates and the test samples cut therefrom. The bromine content of the mixture is always 5.4 percent and the chlorine content 1.3 percent.

TABLE 2

| Example No. | Polystyrene type | After burning time in seconds |
|---|---|---|
| 8 | Impact resistant 7.5 percent by weight polybutadiene-caoutchouc | 11–14–12–14–17 |
| 9 | Impact resistant 9 percent by weight butadiene-styrene caoutchouc | 4–5–14–12–8 |
| 10 | Impact resistant 3.5 percent by weight styrene-butadiene caoutchouc | 3–2–4–5–7 |
| 11 | Styrene homopolymer K value 58 | 4–3–4–8–8 |
| 12 | Styrene homopolymer K value 69 | 3–5–6–1–2 |

EXAMPLE 13

One hundred parts by weight of a styrene homopolymer with a K-value of 63 are mixed with 4 parts by weight of a brominated product of hexamethyl benzene containing 5.5 bromine atoms per molecule and homogenized on a roller. The after-burning times of the sample strips were 1–0–2–1–10 seconds.

EXAMPLE 14

One hundred parts by weight of a styrene-acrylonitrile copolymer of K-value 63 are mixed with 2 parts by weight of a brominated product of hexamethyl benzene containing 5.5 bromine atoms per molecule and homogenized on a roller. The after-burning times of the sample strips were 0–0–0–0–0 seconds.

The K-values were ascertained by the method of H. Fikentscher, Cellulose-chemie, 13 (1932), page 60.

We claim:

1. A fire-resistant thermoplastic molding composition comprising about 100 parts by weight of styrene polymers and about 1–20 parts by weight of hexamethyl benzene brominated to about 33–76 percent by weight of bromine.

2. The composition of claim 1, wherein said styrene polymers are selected from the group consisting of polystyrene, poly-$\alpha$-methylstyrene, mixed polymers containing at least 50 percent styrene and mixed polymers containing at least 50 percent $\alpha$-methylstyrene.

3. The composition of claim 2, wherein said brominated hexamethyl benzene is selected from the group consisting of hexa-(brom-methyl)-benzene, penta-(brom-methyl)-methylbenzene, tetra-(brom-methyl)-dimethylbenzene and brommethyl-pentamethyl.

4. The composition of claim 3, wherein mixtures of said brominated hexamethyl benzenes are used.

5. The composition of claim 4, wherein the concentration of said brominated hexamethyl benzene is about 1–10 parts by weight.

6. The composition of claim 1, wherein said brominated hexamethyl benzene has a bromine content of about 50 to 74 percent by weight of bromine.

7. The composition of claim 2 further comprising antimony trioxide.

8. The composition of claim 2, further comprising liquid organic foaming agents.

9. The composition of claim 2, further comprising chlorinated organic compounds selected from the group consisting of chlorinated paraffines having a chlorine content of about 50 to 80 percent by weight, chlorinated polyethylenes having a chlorine content of about 30 to 55 percent by weight, dimeric hexachlorocyclopentadiene chlorinated terphenyl and tris-chloroethyl phosphate.

* * * * *